M. R. BROWN AND W. L. MARTIN.
FRICTIONAL TRANSMISSION MECHANISM.
APPLICATION FILED AUG 1, 1917.
1,311,592.
Patented July 29, 1919.
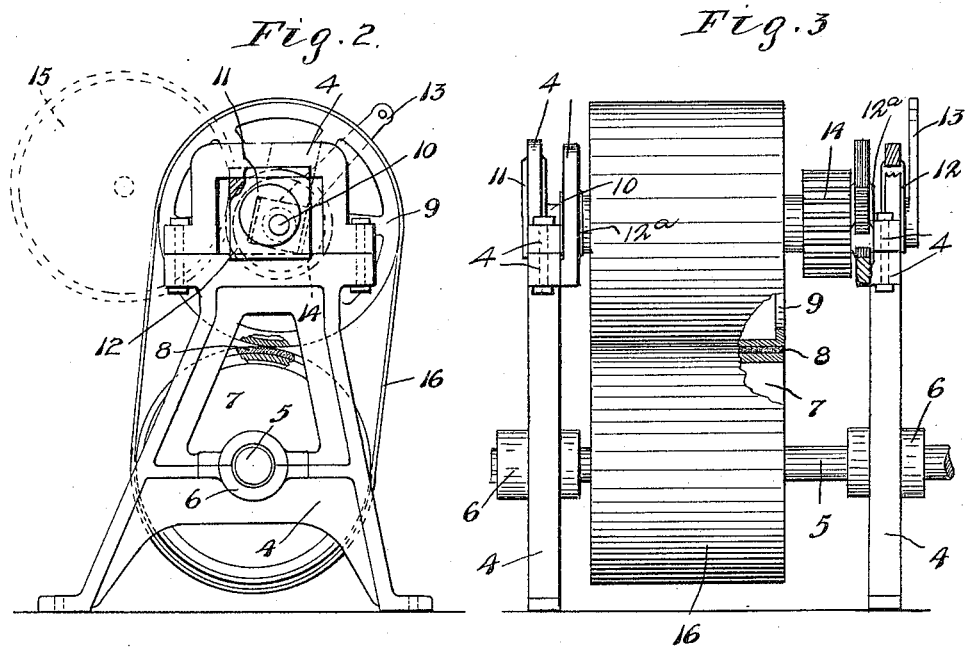
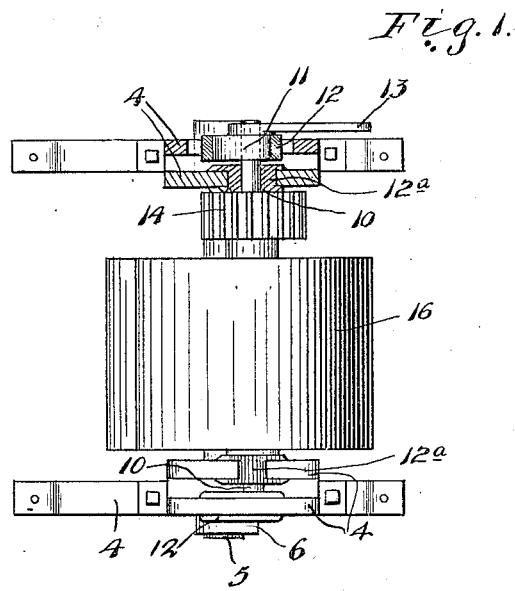
Witnesses.
A. H. Opsahl.
E. C. Wells
Inventors
M. R. Brown.
W. L. Martin.
By their Attorneys.

UNITED STATES PATENT OFFICE.

MORRIS R. BROWN AND WILLIAM L. MARTIN, OF MINNEAPOLIS, MINNESOTA, ASSIGNORS TO MINNESOTA TRACTOR COMPANY, OF MINNEAPOLIS, MINNESOTA, A CORPORATION OF SOUTH DAKOTA.

FRICTIONAL TRANSMISSION MECHANISM.

1,311,592.                    Specification of Letters Patent.     Patented July 29, 1919.

Application filed August 1, 1917.   Serial No. 183,867.

*To all whom it may concern:*

Be it known that we, MORRIS R. BROWN and WILLIAM L. MARTIN, citizens of the United States, residing at Minneapolis, in the county of Hennepin and State of Minnesota, have invented certain new and useful Improvements in Frictional Transmission Mechanism; and we do hereby declare the following to be a full, clear, and exact description of the invention, such as will enable others skilled in the art to which it appertains to make and use the same.

Our invention has for its object to provide an extremely simple and highly efficient reversible transmission mechanism adapted for general use, but particularly adapted for use in connection with traction engines. Generally stated, the invention consists of the novel devices and combinations of devices hereinafter described and defined in the claim.

The device is in the nature of a combined friction wheel and pulley and belt drive combined with means for shifting one of the wheels or pulleys in respect to the other, so that to transmit motion in a forward direction, for example, to the wheels of the vehicle, the friction wheels will be separated and the belt tightened onto the friction wheels, and conversely, to transmit motion to the traction wheels of the vehicle in a reverse direction, slack will be given to the belt and the two friction wheels will be forced into frictional engagement.

In the accompanying drawings which illustrate the invention, like characters indicate like parts throughout the several views.

Referring to the drawings,

Figure 1 is a plan view of the improved reversible transmission mechanism, some parts being sectional;

Fig. 2 is a side elevation of the mechanism shown in Fig. 1, some parts being sectioned; and Fig. 3 is a front elevation of the said parts with some portions broken away and with other portions sectioned.

The friction wheels may be mounted on any suitable frame structure that is adapted for use in the particular machine where the transmission mechanism is employed. As shown, the framework is made up of two laterally spaced pedestals 4. A power-driven lower shaft 5, which may be the engine crank shaft or any shaft driven therefrom, is journaled in suitable bearings 6 on the frame pedestals 4, and carries a wide-faced friction wheel or pulley 7 that has a frictional facing 8.

For coöperation with the friction wheel 7, is an upper or driven friction wheel 9, the axis of which is parallel to that of the shaft 7, the sleeve-like hub of which is loosely journaled on a crank shaft 10. This so-called crank shaft 10, at or near its ends, has eccentrics or crank portions 11 which, as shown, are journaled in bearings 12 that are mounted for limited horizontal sliding movements in the respective pedestals 4, but are held thereby against vertical movements. At one end, the shaft 10 has an operating lever or arm 13. Just inward of the eccentrics 11, the crank shaft is journaled in bearing boxes 12ª that are held against horizontal movements and are guided for limited vertical movements by the coöperating bearing pedestals. The sleeve-like hub of the friction wheel 9 is provided with a spur pinion that is in constant mesh with the driven wheel 15 indicated, diagrammatically, by dotted lines in Fig. 2, only. A belt 16 runs over the friction wheels 7 and 9. This belt 16 is of such length that when the two friction wheels are engaged, said belt will have considerable slack, and hence, will be inoperative as a driving element. By oscillatory movements of the arm 13 and crank shaft 10, the friction wheel 9 may be raised so as to pull the belt 16 into tight frictional engagement with the two friction wheels, thereby driving the shaft 10 in one direction; or the said friction wheel 9 may be moved downwardly and pressed into frictional contact with the friction wheel 7, thereby giving the required slack to the belt 16 and driving the shaft 10 in a reverse direction. Also, it is important to note that by varying the pressure on the belt or on the friction wheels, so as to permit more or less slippage, variable speed drive is also made possible. This variable speed is especially important in starting the tractor.

The belt 16 should be of such length that the two friction wheels may be moved slightly out of frictional contact without throwing the said belt into frictional driving action on the two friction wheels, so as to thereby make it possible to entirely throw the transmission mechanism out of action by movement of the friction wheel 9 into an intermediate position. Here it may be further noted that the movement imparted to the friction wheel 9 is such that it does not materially change the intermeshing engagement between pinion 14 and coöperating gear 15.

The vertically movable guide bearings 12ª hold the crank shaft for true vertical movement or for predetermined upward and downward movements, so that the intermeshing action between the pinion 14 and gear 15 will not be materially changed. Of course, the horizontally movable bearings 12ª simply shift horizontally to hold the eccentrics 11 against vertical movements without interfering with the vertical movements of the body of the crank shaft.

The device, as is obvious, is very simple and of small cost, and at the same time, efficient for the purposes had in view.

What we claim is:

In a reversible transmission mechanism, the combination with laterally spaced horizontally shiftable bearings and laterally spaced vertically shiftable bearings, of a crank shaft having eccentric portions journaled in said horizontally shiftable bearings and having its body portion journaled in said vertically shiftable bearings, a pair of coöperating friction wheels, one of which is journaled on the crank shaft and thereby movable into and out of contact with the other of said wheels, and a belt running over said two friction wheels and arranged to be thrown into action, when said wheels are separated.

In testimony whereof we affix our signatures in presence of two witnesses.

MORRIS R. BROWN.
WILLIAM L. MARTIN.

Witnesses:
CLARA DEMAREST,
BERNICE G. BAUMANN.

Copies of this patent may be obtained for five cents each, by addressing the "Commissioner of Patents. Washington, D. C."